United States Patent
Mancini et al.

[11] Patent Number: 5,960,902
[45] Date of Patent: Oct. 5, 1999

[54] MOTORCYCLE SWING ARM ASSEMBLY WITH REMOVABLE SPACER

[75] Inventors: Raymond L. Mancini, Danbury; Richard L. Mancini, Ridgefield, both of Conn.

[73] Assignee: Mancini Racing, Inc., Danbury, Conn.

[21] Appl. No.: 09/128,578

[22] Filed: Aug. 4, 1998

Related U.S. Application Data

[60] Provisional application No. 60/062,012, Aug. 4, 1997.

[51] Int. Cl.[6] ............................ B62D 61/02; B62K 11/02
[52] U.S. Cl. ........................................... 180/227; 280/284
[58] Field of Search ..................................... 180/227, 218, 180/219; 280/284

[56] References Cited

U.S. PATENT DOCUMENTS

| | | | |
|---|---|---|---|
| 4,463,824 | 8/1984 | Boyesen | 180/227 |
| 4,673,053 | 6/1987 | Tanaka et al. | 180/227 |
| 4,813,697 | 3/1989 | Takada | 280/284 |
| 5,011,459 | 4/1991 | Van De Val | 474/101 |
| 5,657,830 | 8/1997 | Kawashima | 180/220 |

*Primary Examiner*—J. J. Swann
*Assistant Examiner*—Andrew J. Ririe
*Attorney, Agent, or Firm*—Darby & Darby

[57] ABSTRACT

A swing arm assembly for use with a motorcycle and including provisions which aid in the replacement of a drive belt. The swing arm includes two side members for supporting the rear wheel of the motorcycle and a connecting member which is pivotally attached to the main frame of the motorcycle using at least one connection bolt. The drive belt is positioned between the two side members and around the connecting member. The connecting member is attached to the side members and includes a removable spacer. The spacer may be selectively removed so that a gap is provided through the connecting member and between the two side members. The gap is sized to accommodate the passage of the drive belt, during its replacement. The spacer is preferably secured to the connecting member by the connection bolt.

6 Claims, 3 Drawing Sheets

MOTORCYCLE SWING ARM ASSEMBLY WITH REMOVABLE SPACER

CROSS-REFERENCE TO RELATED APLICATIONS

This application claims priority pursuant to 35 U.S.C. 119 from Provisional Application Ser. No. 60/062,012 filed Aug. 4, 1997, the entire disclosure of which is hereby incorporated by reference.

BACKGROUND OF THE INVENTION a) Field of the Invention

This invention generally relates to suspension and drive systems of motorcycles and, more particularly, to swing arm assemblies of such suspension systems and such drive systems that include an endless belt positioned through the swing arm and used to transmit rotational power from the motorcycle's engine to a rear wheel.

b) Description of the Prior Art

There are three main types of drive systems of today's motorcycles, that is, three different ways to transfer the rotational torque from the crank of the motorcycle's engine to the motorcycle's rear wheel; by drive chain, rotatable drive shaft, or endless toothed drive belt. Although each of these drive systems includes advantages, they are not without problems.

The earliest and probably most widely used drive system is the drive chain. The drive chain of a motorcycle is similar in construction to a standard bicycle chain. The motorcycle chain is made from pivotally connected linking elements, each of which rotatably supports an intermediate contact sleeve. The contact sleeves of the drive chain engage the teeth of the motorcycle's drive sprockets, one sprocket is mounted to the crank at the engine, the other is attached to the rear wheel. Although the drive chain provides a strong and low cost method of transmitting drive torque to the rear wheel of a motorcycle, being made from metal, the chain is heavy and must be kept well lubricated throughout its service life. Another problem with using a chain as a drive component is that as the individual links engage and disengage the two sprockets of the motorcycle, they make noise. One benefit with using the drive chain, however, is that should the chain require removal from the motorcycle, two adjacent connecting links may be simply detached from each other by removing a press-fit connecting pin.

More and more motorcycles are using drive belts to drive the rear wheel. The drive belt is a flexible endless belt made from various materials including rubber plastic and reinforcing fibers. The belt is molded as a single, endless piece and includes integrally molded teeth which engage appropriately sized and shaped toothed pulleys (in place of the sprockets in the above-described chain version). The belt has the advantages of being very quiet as it drives the rear wheel of a motorcycle, and does not require lubrication. However, a problem with using such an endless belt to drive a motorcycle is that it will wear more quickly than a chain and typically must be periodically replaced.

Both the chain and the belt are connected between the motorcycle's engine and its rear wheel, typically passing between members of a swing arm assembly. The swing arm assembly is a sub-frame that directly supports the rear wheel. The swing arm is pivotally attached to the main frame and includes a suspension spring and usually a shock absorber located between it and the main frame. Typically, the construction of the swing arm assembly (with an attached wheel) "closes" the belt or chain within the swing arm assembly and prevents its quick and easy removal from the swing arm assembly. Of course, as described above, the chain may be disassembled and thereby removed from the swing arm. However, if an endless belt is used, the entire swing arm assembly must first be removed.

The swing arm assembly of most motorcycles includes a bushing which aligns with and is pivotally attached to a mating bushing (or two opposing bushings) of the main frame of the motorcycle. The swing arm assembly is pivotally attached to the main frame using a bolt (or opposing bolts) positioned along the aligned bushings, defining a pivot axis. These bolts must be removed to detach the swing arm assembly from the main frame of the motorcycle. Furthermore, since the swing arm assembly is under a spring bias from the suspension spring, it is likely that the suspension components must be removed prior to detaching the swing arm assembly from the main frame.

Although possible to accomplish the removal of the swing arm assembly and the suspension components, and ultimately, the endless belt, this procedure is complex and time consuming, and cannot be easily performed when traveling, such as if an endless belt breaks or otherwise requires replacement at a remote location.

It is therefore an object of the invention to provide a swing arm assembly pivotally connected to a main frame of a motorcycle along a pivot axis which includes means to remove an endless drive belt past the pivot axis without detaching the swing arm assembly from the main frame and without detaching any of the suspension components of the motorcycle.

It is another object of the invention to provide a swing arm assembly which overcomes the deficiencies of the prior art.

SUMMARY OF THE INVENTION

A swing arm assembly for use with a motorcycle and including provisions which aid in the replacement of a drive belt. The swing arm includes two side members for supporting the rear wheel of the motorcycle and a connecting member which is pivotally attached to the main frame of the motorcycle using at least one connection bolt. The drive belt is positioned between the two side members and around the connecting member. The connecting member is attached to the side members and includes a removable spacer. The spacer may be selectively removed so that a gap is provided through the connecting member and between the two side members. The gap is sized to accommodate the passage of the drive belt, during its replacement. The spacer is preferably secured to the connecting member by the connection bolt.

DETAILED DESCRIPTION OF THE PREFERRED EMBODIMENT

Figure 1:
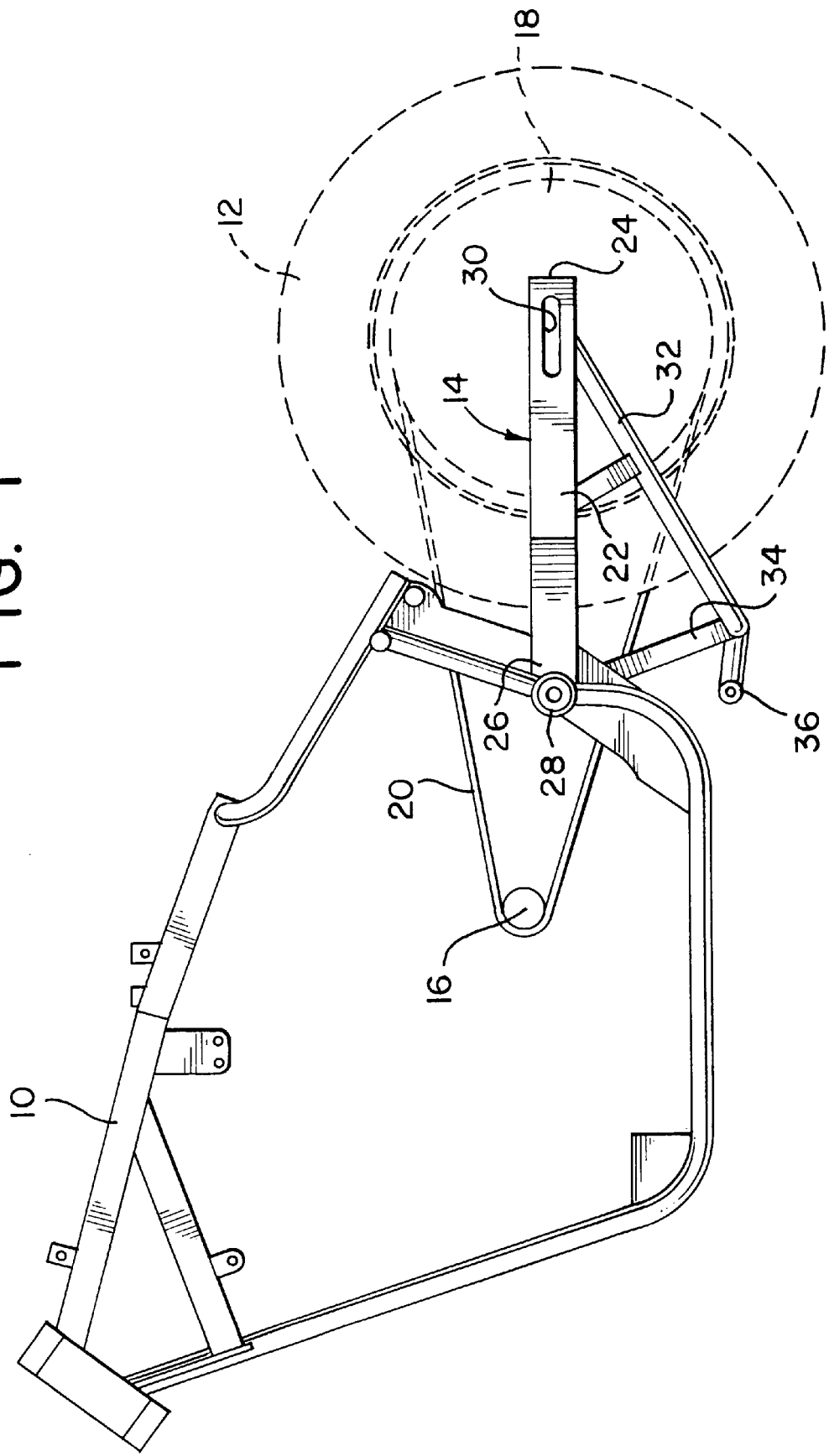
FIG. 1 is a side view of a motorcycle showing a drive belt attached between an engine and a rear wheel, and a swing arm assembly pivotally attached to a main frame, according to the invention.

Referring to FIG. 1, a motorcycle frame 10 is shown attached to a rear wheel 12 using a swing arm 14. An engine (not shown) is mounted within frame 10 and includes a drive pulley 16. A wheel pulley 18 is attached to rear wheel 12, and is mechanically connected to drive pulley 16 of the engine, through a drive belt 20. Belt 20 may be a conventional endless loop of reinforced rubber/plastic which includes integrally formed drive teeth that have a pitch adapted to engage similar teeth located on drive pulley 16 and wheel pulley 18. The belt arrangement thus described is well known in the art and allows the efficient transmission of mechanical rotation from the engine to wheel pulley 18 so that rotation of the engine causes rotation of rear wheel 12.

As can be seen in FIG. 1, and as is typical in many motorcycles, drive belt 20 passes through openings defined by the individual members that make up frame 10 and swing arm assembly 14. Although this allows clearance for drive belt 20 to operate between drive pulley 16 and wheel pulley 18, the endless belt 20 becomes "trapped" by frame 10 and swing arm assembly 14. The result is that although use of an endless belt to drive a motorcycle provides clear benefits over the use of a conventional chain, the belt is difficult to replace.

Figure 3:
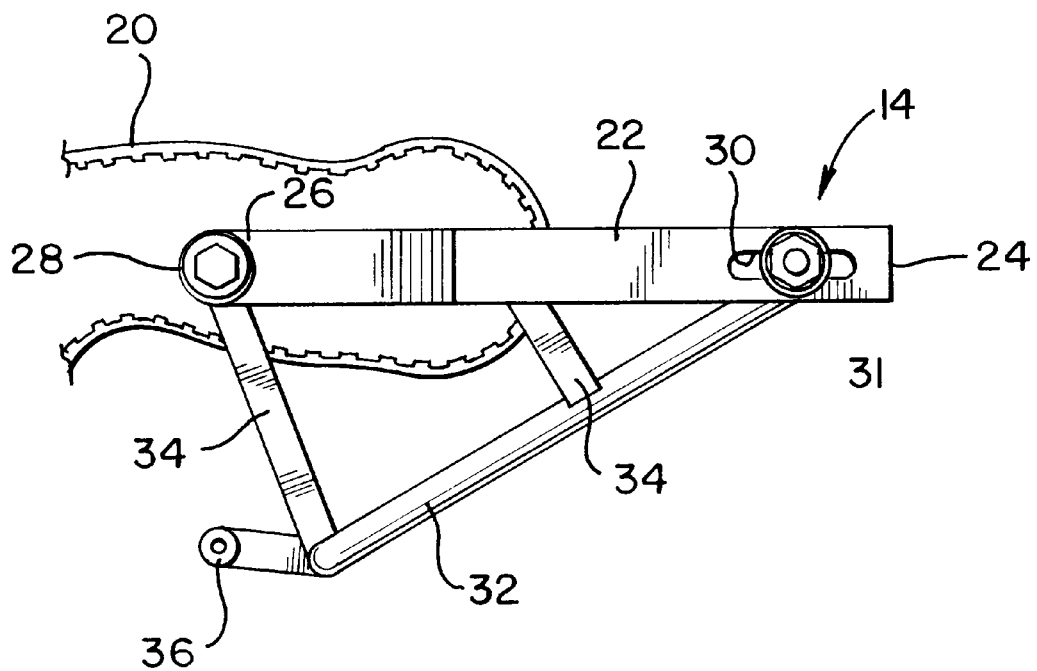
FIG. 3 is a side view of the swing arm assembly, according to the invention.
Figure 4:
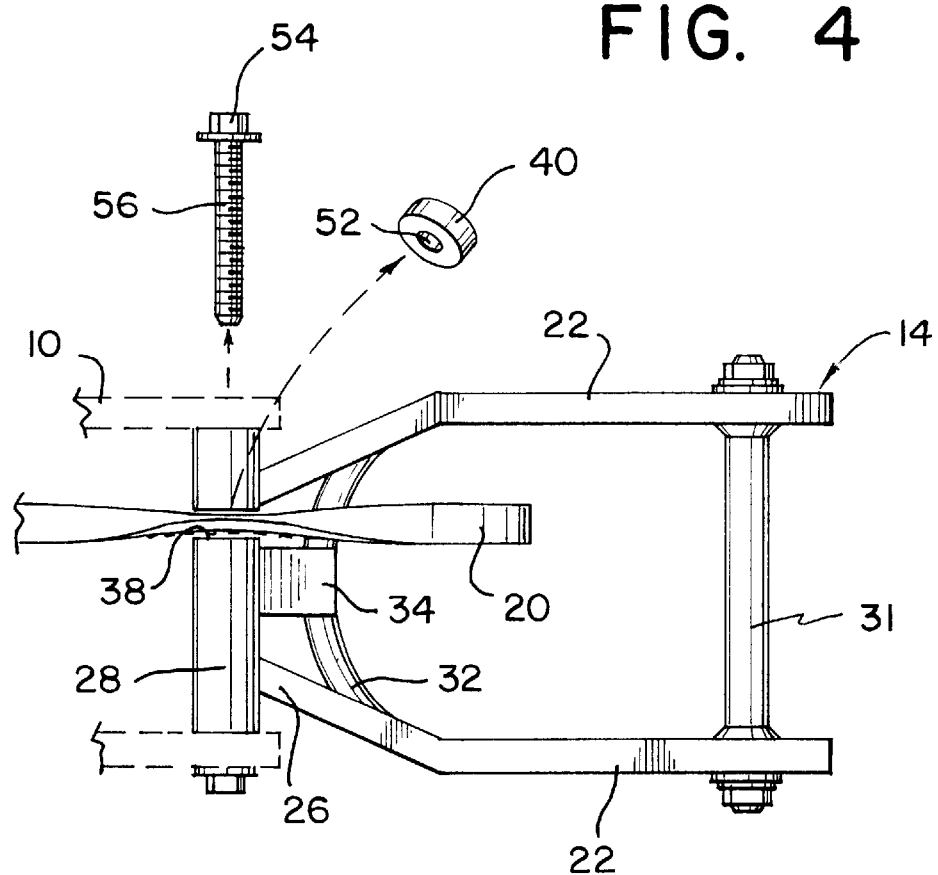
FIG. 4 is a plan top view of the swing arm assembly, showing a securing bolt and the removable spacer detached from the swing arm assembly, according to the invention.

Swing arm assembly 14 includes two generally parallel side members 22, each of which has an open end 24 and a fixed end 26. As shown in FIGS. 3 and 4, each fixed end 26 of side members 22 is connected (e.g., through welding) to a connection tube 28, which is, in turn, pivotally attached to a motorcycle frame 10, as described below.

Each open end 24 of side members 22 includes an appropriate slot 30 for receiving a wheel axle 31 for the purpose of directly securing rear wheel 12 to side members 22 and indirectly to motorcycle frame 10. Slots 30 provide some angular displacement of rear wheel 12 so that rear wheel 12 may be properly aligned, as required and as understood by those skilled in the art.

Figure 2:
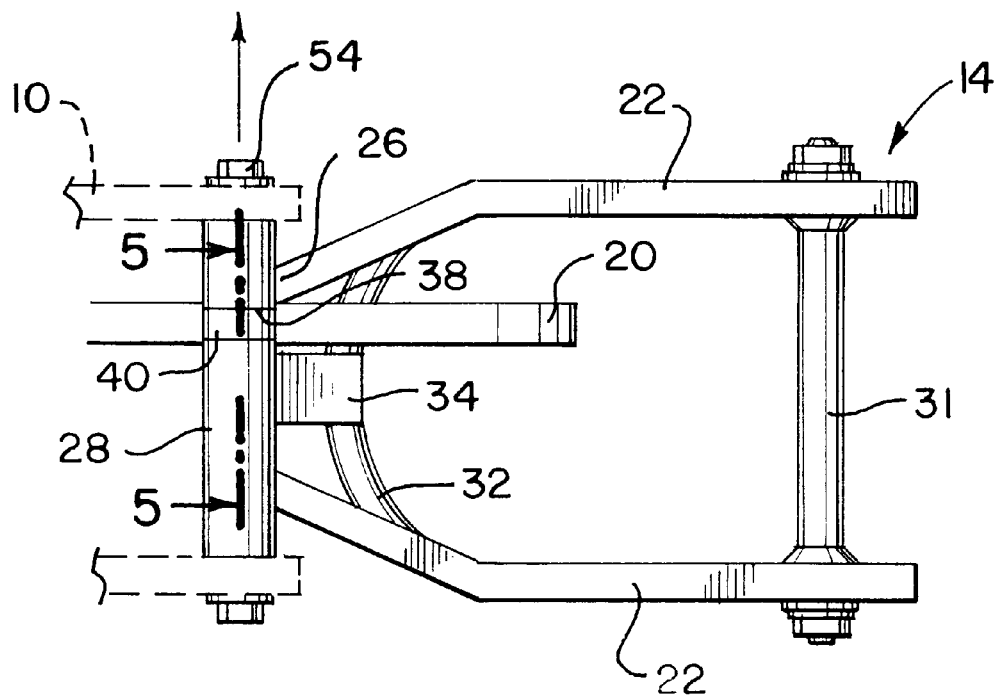
FIG. 2 is a top plan view of the swing arm assembly, showing a removable spacer in place, according to the invention.

As shown in FIGS. 2, 3 and 4, depending on the specific design of the motorcycle and the materials used to make the swing arm assembly, side members 22 may be supported by brace members 32, and anchor members 34. In this case, brace members 32 extend forward and downwardly attached (through welding) to open ends 24 of each side member 22 and to one end of each anchor member 34. The remaining ends of each anchor member 34 are attached to a mid section of each side member 22 and connection tube 28, respectively. Swing arm assembly 14 is a frame in itself and is preferably rigid. Swing arm assembly 14 is pivotally attached to frame 10 through connection tube 28, along a connection axis A so that rear wheel 12 may pivot about connection axis A as the motorcycle is driven. To control the and magnitude and velocity of angular displacement of swing arm assembly 14 about connection axis A, appropriate shock absorbers and springs (not shown) may be attached between frame 10 and swing arm assembly 14, at a connection point 36, as shown in FIG. 3.

Most motorcycle frames support their swing arm assembly is such a manner that results in an endless belt (or chain) 20 connecting drive pulley 16 and wheel pulley 18, on opposing sides of connection tube 28 so that to remove or replace belt 20, the entire swing arm assembly 14 must be detached from frame 10, including separating any shock absorber and suspension spring (not shown).

Figure 5:
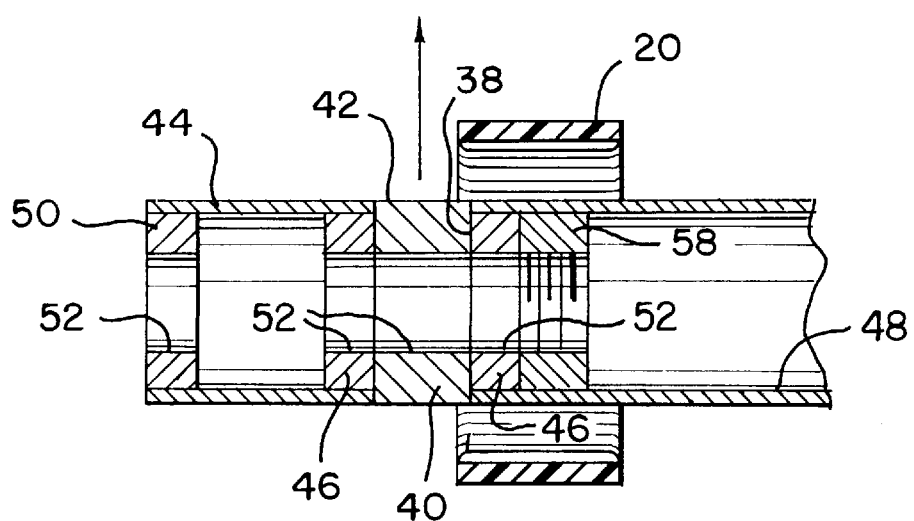
FIG. 5 is a sectional partial side view of the swing arm assembly, taken along the lines 5—5 of FIG. 2, without the securing bolt, according to the invention.

According to the invention, referring to FIGS. 2, 4 and 5, connection tube 28 includes a gap 38, into which a removable spacer 40 is positioned. Spacer 40 is preferably similar in cross-section to the cross-section of connection tube 28 so that an outer surface 42 of spacer 40 is flush with an outer surface 44 of connection tube 28, when spacer 40 is positioned within gap 38. Connection tube 28 preferably includes a reinforcement plug 46 secured (welded or brazed) to an inside wall surface 48 of connection tube 28, on both sides of gap 38, as shown in FIG. 5. Another reinforcement plug 50 may be provided at either end of connection tube 28, again secured to inside wall surface 48. The purpose of the two reinforcement plugs 46 is to provide a surface adjacent to gap 38 against which spacer 40 may bear without damaging connection tube 28, as the assembly is secured and compression forces applied, as described below.

Reinforcement plugs 46 and 50, and spacer 40 each include a central opening 52 which is sized to snugly receive a fastening bolt 54, shown in FIGS. 2 and 4. A shaft portion 56 of fastening bolt 54 may be inserted through each opening 52, and includes threads which selectively engage mating threads of a nut 58 that is positioned adjacent to an innermost reinforcement plug 46.

In operation, according to the invention, to remove belt 20 from around connection tube 28, fastening bolt 54 is first removed from connection tube 28. Removal of fastening bolt 54 allows spacer 40 to be laterally displaced from between reinforcement plugs 46, thereby exposing gap 38. Once gap 38 is "open", belt 20 may be passed through gap 38 and past connection tube 28. A new belt 20 may be likewise inserted through gap 38. Spacer 40 is then repositioned within gap 38 so that opening 52 of spacer 40 aligns with openings 52 of adjacent reinforcement plugs 46. Once spacer 40 is positioned within gap 38, fastening bolt 54 is reinserted through opening 52 of reinforcement plug 50, opening 52 of reinforcement plug 46, opening 52 of spacer 40, opening 52 of reinforcement plug 46, and finally engaging with threads of nut 58. As fastening bolt 54 is tightened reinforcement plugs 46 compress against spacer 40 and effectively form a single-piece connecting tube 28 that is strong enough to support swing arm assembly 14, as required.

Spacer 40 is wide enough to accommodate belt 20 and preferably has a width that is between the magnitudes of the thickness and the width of belt 20. Since belt 20 may easily be twisted, as shown in FIG. 4, it is preferred that spacer 40 have a width that is just thicker than the thickness of belt 20. In such instance, belt 20 is twisted and laterally passed through gap 38.

According to the invention, it is only required to remove one of the two fastening bolts 54 that secure swing arm assembly 14 to frame 10.

| Reference-Number Guide | |
|---|---|
| motorcycle frame | 10 |
| rear wheel | 12 |
| swing arm | 14 |
| drive pulley | 16 |
| wheel pulley | 18 |
| drive belt | 20 |
| side members | 22 |
| open end | 24 |
| fixed end | 26 |

-continued

| Reference-Number Guide | |
|---|---|
| connection tube | 28 |
| slot | 30 |
| wheel axle | 31 |
| brace member | 32 |
| anchor member | 34 |
| connection point | 36 |
| gap | 38 |
| spacer | 40 |
| outer surface (spacer) | 42 |
| outer surface (connection tube) | 44 |
| reinforcement plug | 46 |
| inside wall surface (connection tube) | 48 |
| reinforcement plug | 50 |
| opening | 52 |
| fastening bolt | 54 |
| shaft portion | 56 |
| nut | 58 |

What is claimed is:

1. A swing arm assembly of the type including a frame having side members and a pivotal connecting member, said side members being attached to said pivot connecting member and being adapted to support a rear wheel of a motorcycle, said motorcycle including a main frame, an engine mounted to said main frame and including a drive pulley, and a drive belt connecting said drive pulley with said rear wheel, said drive belt being positioned around said pivotal connecting member, said swing arm assembly comprising:

means for pivotally attaching said pivotal connecting member to said main frame of said motorcycle; and a spacer located within said pivotal connecting member, between said side members, said spacer being selectively movable between an attached position wherein said spacer is attached to said pivotal connecting member, and a detached position wherein said spacer is detached from said pivotal connecting member, a gap being established within said pivotal connecting member when said spacer is located within said detached position, said gap being sized to accommodate passage of said drive belt so that said drive belt may be removed from around said pivotal connecting member.

2. The swing arm assembly, according to claim 1, wherein said pivotal attaching means being selectively removable.

3. The swing arm assembly, according to claim 2, wherein said movement of said spacer to said detached position being responsive to said selective removal of said attaching means.

4. The swing arm assembly, according to claim 1, wherein said connecting member is tubular and includes reinforcement plugs on both sides of said spacer.

5. The swing arm assembly, according to claim 4, wherein said pivotal attaching means includes a bolt, and said reinforcement plugs include a central opening adapted to receive said bolt.

6. A motorcycle comprising, a main frame supporting an engine, said engine having a drive pulley;

a swing arm including two side members adapted to support a rear wheel, and a connecting member attached to said side members and being pivotally attached to said main frame;

a drive belt adapted to connect said drive pulley with said rear wheel, said drive belt positioned between said side members and around said connecting member; and a spacer located within said connecting member, between said side members, said spacer being moveable between an attached position wherein said spacer is attached to said connecting member, and a detached position wherein said spacer is detached from said connecting member, a gap being established when said spacer is located in said detached position, said gap being sized to accommodate the passage of said drive belt past said connecting member, facilitating the removal of said drive belt from around said connecting member during its replacement.

* * * * *